United States Patent
Poder et al.

(10) Patent No.: US 7,338,086 B2
(45) Date of Patent: Mar. 4, 2008

(54) CONNECTOR WITH ENHANCED SAFETY

(75) Inventors: Philippe Poder, Guichen (FR);
Philippe Blivet, Rennes (FR)

(73) Assignee: Legris SA, Rennes (FR)

( * ) Notice: Subject to any disclaimer, the term of this patent is extended or adjusted under 35 U.S.C. 154(b) by 256 days.

(21) Appl. No.: 10/535,945

(22) PCT Filed: Nov. 14, 2003

(86) PCT No.: PCT/FR03/03373

§ 371 (c)(1),
(2), (4) Date: May 24, 2005

(87) PCT Pub. No.: WO2004/051133

PCT Pub. Date: Jun. 17, 2004

(65) Prior Publication Data

US 2006/0151999 A1    Jul. 13, 2006

(30) Foreign Application Priority Data

Nov. 25, 2002  (FR)  ................................. 02 14728

(51) Int. Cl.
*F16L 35/00* (2006.01)
(52) U.S. Cl. .................... 285/81; 285/921; 285/82; 285/313; 285/319
(58) Field of Classification Search .............. 285/23, 285/93, 921, 81, 82, 83, 84, 86, 87, 308, 285/307, 313, 319, 39
See application file for complete search history.

(56) References Cited

U.S. PATENT DOCUMENTS

| | | | |
|---|---|---|---|
| 4,869,534 A | | 9/1989 | Ketcham et al. |
| 5,069,424 A | * | 12/1991 | Dennany et al. .......... 251/149.6 |
| 5,441,313 A | * | 8/1995 | Kalahasthy ................... 285/93 |
| 5,649,724 A | * | 7/1997 | Wiethorn ...................... 285/93 |
| 5,658,020 A | | 8/1997 | Carman et al. |
| 6,082,779 A | * | 7/2000 | Lesser et al. .................. 285/93 |
| 6,536,807 B1 | * | 3/2003 | Raymond et al. ............. 285/93 |
| 6,672,625 B2 | * | 1/2004 | Trede et al. ................... 285/81 |
| 6,851,721 B2 | * | 2/2005 | Poder .......................... 285/93 |
| 6,863,314 B2 | * | 3/2005 | Guest .......................... 285/81 |

FOREIGN PATENT DOCUMENTS

| | | |
|---|---|---|
| DE | 101 15 399 | 6/2002 |
| FR | 2 705 430 | 11/1994 |

* cited by examiner

*Primary Examiner*—Daniel P. Stodola
*Assistant Examiner*—Jay R Ripley
(74) *Attorney, Agent, or Firm*—Young & Thompson

(57) ABSTRACT

A connector with enhanced safety includes: a female component defining a stepped housing, a male component with a flange, whereof the outer diameters correspond to those of the stepped housing of the female component, a lock collar transversely mobile in a base of the female component, located at the intake thereof. There is an additional locking cage whereof one wall forms a front cap at the end of the female component, mounted sliding on the base of the lock collar between a connecting position allowing the flange to pass through the front cap of the cage, and a locking position preventing the flange from passing through the front cap, the cage including, parallel to the cap and at the rear thereof, a wire pin whereof the elastic branches define each of the two positions through matching shapes with the female component.

7 Claims, 1 Drawing Sheet

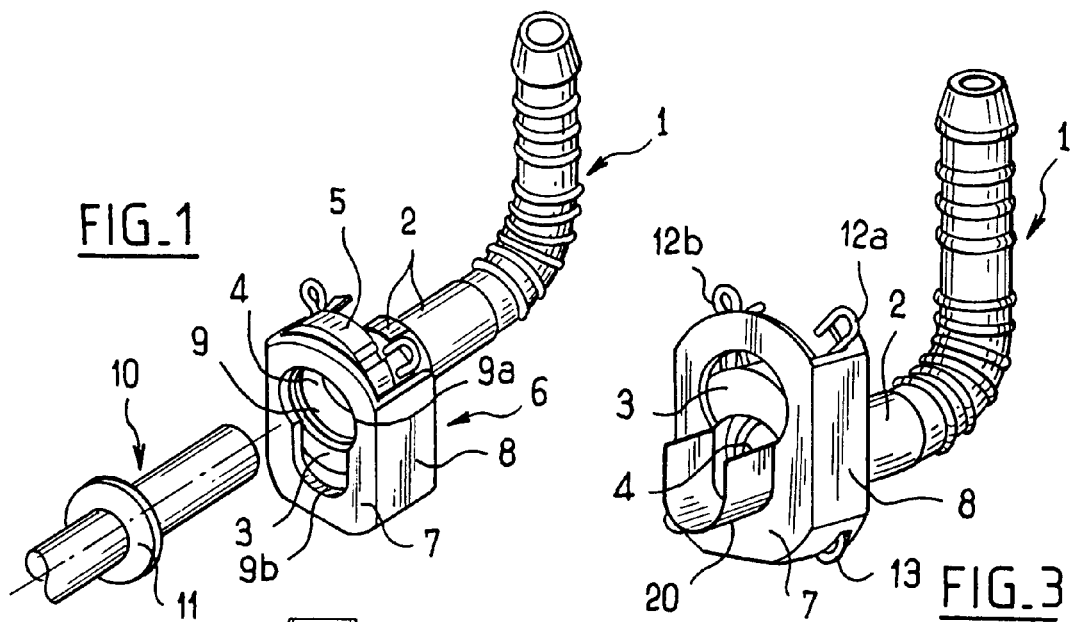
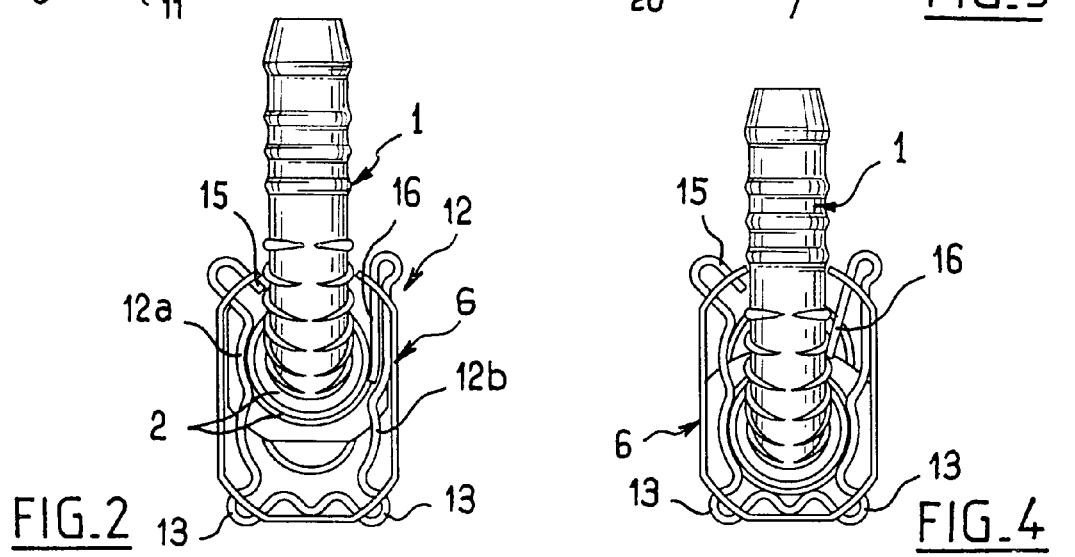
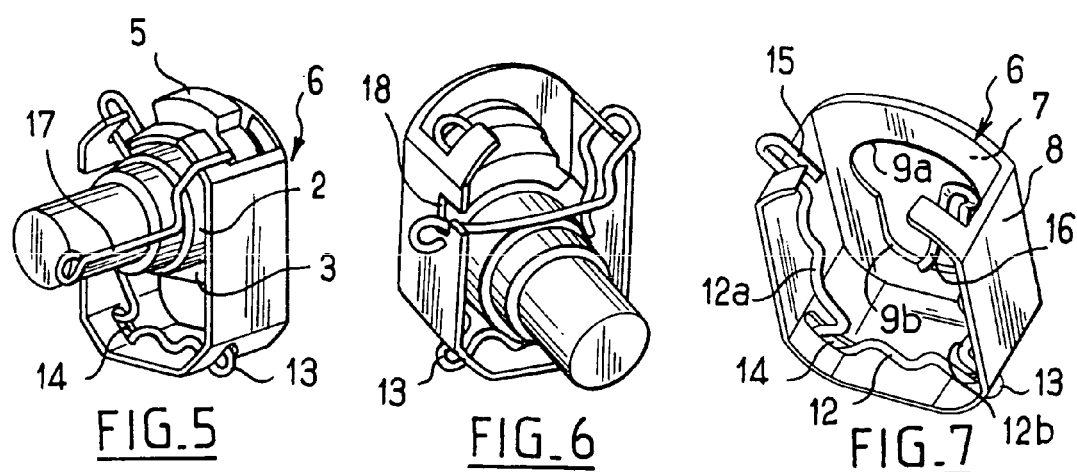

CONNECTOR WITH ENHANCED SAFETY

FIELD OF THE INVENTION

The present invention relates to a coupling with increased safety for connection applications having high grade requirements in terms of protecting users and protecting the environment.

BACKGROUND OF THE INVENTION

Locking couplings are well known. Such couplings comprise a male endpiece, a female endpiece, an outer collar or groove of the male endpiece, and an abutment that is movable transversely in the wall of the female endpiece to be received in the groove or behind the collar of the male endpiece when it is in place in the female endpiece.

Some such devices include an indicator for showing whether or not the connection has been made correctly, so as to reduce the risks associated with poor coupling.

Because couplings are made of plastics material, the safety of such connections is limited to applications in hydraulic or pneumatic circuits at medium pressure. Unfortunately, in particular in the automobile industry, there exist fluid circuits in which operating pressures are becoming higher and higher.

OBJECT OF THE INVENTION

The invention seeks to satisfy both the increased safety requirements in terms of connection quality, and the demand for increased mechanical strength characteristics for a coupling in order to enable ever-higher pressures to be contained.

BRIEF SUMMARY OF THE INVENTION

To this end, the present invention thus provides a coupling with increased safety, comprising:
- a female endpiece defining a stepped housing;
- a male endpiece with a collar, the outside diameters thereof corresponding to the diameters of the stepped housing in the female endpiece; and
- a locking ring movable transversely in a base of the female endpiece, situated at the entrance to the housing therein;

the coupling being remarkable in that it includes an additional locking cage having a wall forming a front cap at the end of the female endpiece and mounted to slide on the base of the locking ring between a connection position allowing the collar to pass through the front cap of said cage, and a locking position preventing said collar from passing through said front cap. The cage which covers the hollow base of the locking ring of the female endpiece serves to reinforce said base, i.e. the weakest parts of the lock constituted by said base and the ring-mounted to slide transversely, making it practically impossible to withdraw the collar secured to the male endpiece from the cage.

Preferably, the cage is made from a stamped piece of sheet metal. Parallel to the cap and behind it, the cage has a wire clip with resilient branches defining each of the two above-mentioned positions by shape matches with the female endpiece.

The end of each branch has a catch for holding the cage on the base, each catch corresponding to one of the two above-mentioned positions.

BRIEF DESCRIPTION OF THE DRAWINGS

Other characteristics and advantages of the invention appear from the following description of two embodiments given by way of indication.

Reference is made to the accompanying drawings, in which:

FIGS. 1 and 2 are two outside views of a coupling of the invention in the position for connecting the cage relative to the female endpiece;

FIGS. 3 and 4 are two similar views of this embodiment of the invention, the cage being in its position for locking the connection;

FIGS. 5 and 6 show a variant embodiment of a coupling of the invention, in two rear views showing the connection position and the position for locking the cage of the invention put in place on the female endpiece; and FIG. 7 is an outside view of the first embodiment showing the cage on its own.

DETAILED DESCRIPTION OF THE INVENTION

The female endpiece shown in FIGS. 1 to 4 is an endpiece 1 with a bend, having a connection terminal section defining, in conventional manner, a stepped cylindrical housing having an outside wall 2 that can be seen in the figures. At the end of this stepped cylindrical housing, the endpiece 1 has a base 3 of substantially square shape, which base is hollow and contains a locking ring 4 that is movable transversely relative to the housing 2 in the hollow base 3 against resilient members which return it to a high position, in which position a pusher 5 projects from the base 3 and serves to drive the locking ring in order to implement a disconnection. A structure of this type is shown in full in document FR 2 705 430.

Each of the figures also shows a cage 6 having a front wall 7 forming a front cap provided with rims 8 extending rearwards. The base 3 can be received between the rims, behind the front wall 7. The height of the cage 6 is greater than the side of the base 3 in this direction, such that the cage can take up a plurality of positions relative to the base in the height direction.

The front cap 7 of the cage is provided with a keyhole-shaped opening 9. This opening thus presents a portion 9a of circular outline and a portion 9b of U-shaped outline opening out into the portion 9a. The front opening in the hollow base 3 possesses a diameter that is substantially identical to the diameter of the portion 9a of the keyhole-shaped opening 9. The width of the portion 9b of this opening 9 is naturally smaller than the diameter of the portion 9a, such that when the base 3 is in register with said portion 9b, the edges of this opening masks the front opening of the base 3, in part. It will thus be understood that when the base opening is in register with the portion 9a of the opening 9, a male endpiece 10 with a collar 11 can pass through the opening and penetrate into the base, so it is possible to connect together the male endpiece and the female endpiece. In contrast, when the cage and the base are in their other relative position, the collar 11 cannot penetrate into the hollow base 3, and if it is already there, it cannot escape therefrom.

The cage 6 is connected to the female endpiece 1 by a wire clip 12 which is held in the cage at a distance from the front cap 7, as can be seen in FIG. 7. This metal clip is generally U-shaped with lugs 13 at its bottom corners that penetrate into slots 14 in the side walls 8 of the cage 6. Each of the limbs 12a, 12b of the U-shape possesses two curves that co-operate with the two curves in the other limb to define means for indexing two positions for the portion 2 of the female endpiece on which the cage 6 is mounted. The free end of the limb 12a is folded over to form a catch 15, while the free end of the limb 12b is folded over to form a catch 16 that is longer than the catch 15. In FIG. 7, it can be seen that the side wall 8 of the cage 6 is notched in its top portion so as to allow the cage to be put into place on the base 3 by sliding parallel to the front catch 7.

In order to keep the clip 12 secured to the cage 6, the U-shaped bottom defined by the clip 12 is of a corrugated shape, such that after being put into place in the slots 14, the two corrugations of the bottom are flattened at least in part, thereby lengthening the bottom and causing the two lugs 13 to penetrate into the slots 14 without it being possible for them to escape therefrom. When the hollow base 3 is put into place on the endpiece by means of the cage 8, the stepped cylindrical portion 2 situated behind the base 3 of the endpiece 1 causes the limbs 12a, 12b to splay apart as it passes between them so as to take up a first indexed position as shown in FIGS. 2 and 5 in which firstly the catch 15 returns to above this section of the endpiece 1, and secondly the limbs 12a and 12b move towards each other against said section 2 which is received in their first curves. Simultaneously, the catch 16 (as shown in FIG. 2) is pressed down against the limb 12b. This first indexed position is the position in which the endpiece fitted with the cage is delivered, and the position in which it is possible to make a connection. Thus, when the male endpiece 10 is inserted into the female endpiece, the user moves the cage and the endpiece relative to each other in such a manner as to reach the second indexed position defined by the other two curves closer to the lugs 13 of the clip 12. In this position, the catch 16 is released and constitutes an abutment against the cage sliding relative to the base 3. It is not possible to separate the two endpieces 1 and 10 given the resistance opposed by the cage to any separation movement of the two endpieces because of the extreme stiffness of the front cap 7 and because the clip 12 is practically undeformable when snapped in the cage 8 both via its lugs 13 and via the bends connecting the catches 15 and 16 to the limbs 12a and 12b.

In FIGS. 5 and 6, it can be seen that the clip possesses a limb 12b that, instead of having a catch 16, has an extension 17 parallel to the section 2 of the female endpiece 1 when the relative position of the cage and said endpiece corresponds to the first indexed position, i.e. the position for connecting the endpiece, and that is bent resiliently behind the base 3 in order to catch in a notch 18 in the wall 8 of the cage 6 once the locking position has been reached.

FIG. 3 shows a variant embodiment of the cage of the invention in which the portion 9b of the keyhole-shaped opening 9 is bordered by a wall 20 projecting forwards from the cap 7. The purpose of the wall 20 is to prevent the ring from going from the connection position to the locking position relative to the female endpiece unless the endpiece 10 has penetrated fully into the female endpiece 1, i.e. so long as the collar 11 remains outside the front face of the cap 7.

The invention claimed is:

1. A coupling with increased safety, the coupling comprising:
   a female endpiece (1) defining a stepped housing (2);
   a male endpiece (10) with a collar (11), the outside diameters thereof corresponding to the diameters of the stepped housing in the female endpiece (1);
   a locking ring (4) movable transversely in a base (3) of the female endpiece (1), situated at the entrance to the housing therein; and
   an additional locking cage (6) having a wall forming a front cap (7) at the end of the female endpiece and mounted to slide transversely on the base (3) of the locking ring (4) between a connection position allowing the collar (11) to pass through the front cap (7) of said cage, and a locking position preventing said collar from passing through said front cap;
   wherein the cage (6) includes a wire metal clip (12) extending parallel to said front cap (7) and located behind said front cap, the clip having resilient limbs comprising means for indexing the two above-mentioned positions by shapes matching the female endpiece (1).

2. A coupling with increased safety according to claim 1, wherein the end of each limb (12a, 12b) of the clip (12) has a catch (15, 16) for retaining the cage on the female endpiece (1) in each of the two above-mentioned positions.

3. A coupling with increased safety according to claim 1, wherein one of the limbs (12b) of the clip possesses an end section (17) suitable for being folded down and held transversely to the female endpiece (1) behind the base (3) when the cage (6) is in its locking position.

4. A coupling with increased safety according to claim 1, wherein the cage (6) is made of metal.

5. A coupling with increased safety according to claim 1, wherein said wire metal clip (12) is U-shaped.

6. A coupling with increased safety according to claim 1, wherein the cap (7) includes a keyhole-shaped opening (9).

7. A coupling with increased safety according to claim 6, wherein a narrower portion (9b) of the opening (9) is bordered by a wall (20) projecting from the front face of the cap (7).

* * * * *